(12) United States Patent
Jain et al.

(10) Patent No.: US 10,693,782 B2
(45) Date of Patent: *Jun. 23, 2020

(54) METHOD AND SYSTEM FOR SERVICE SWITCHING USING SERVICE TAGS

(71) Applicant: Nicira, Inc., Palo Alto, CA (US)

(72) Inventors: Jayant Jain, Cupertino, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,487

(22) Filed: May 7, 2018

(65) Prior Publication Data
US 2018/0262427 A1 Sep. 13, 2018

Related U.S. Application Data

(63) Continuation of application No. 14/960,441, filed on Dec. 7, 2015, now Pat. No. 9,979,641, which is a
(Continued)

(51) Int. Cl.
*H04L 12/741* (2013.01)
*H04L 29/08* (2006.01)
(Continued)

(52) U.S. Cl.
CPC .......... *H04L 45/74* (2013.01); *H04L 12/4633* (2013.01); *H04L 45/306* (2013.01);
(Continued)

(58) Field of Classification Search
CPC ... H04L 12/741; H04L 12/931; H04L 12/725; H04L 29/08; H04L 12/46; H04L 67/10;
(Continued)

(56) References Cited

U.S. PATENT DOCUMENTS 6,006,264 A 12/1999 Colby et al.
6,104,700 A 8/2000 Haddock et al.
(Continued)

FOREIGN PATENT DOCUMENTS

CN 1689369 A 10/2005
CN 101729412 A 6/2010
(Continued)

OTHER PUBLICATIONS

PCT International Search Report and Written Opinion dated Sep. 25, 2014 for commonly owned International Patent Application PCT/US14/036275, 10 pages, VMware, Inc.
(Continued)

*Primary Examiner* — Man U Phan
(74) *Attorney, Agent, or Firm* — Adeli LLP

(57) ABSTRACT

The disclosure herein describes a system, which provides service switching in a datacenter environment. The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a required service, the service portal, and a tunnel encapsulation. The service switching gateway can encapsulate the packet based on an encapsulation mechanism supported by the service portal and forward the packet based on the mapping.

18 Claims, 9 Drawing Sheets

Related U.S. Application Data continuation of application No. 13/891,025, filed on May 9, 2013, now Pat. No. 9,225,638.

(51) Int. Cl.
  *H04L 12/725* (2013.01)
  *H04L 12/46* (2006.01)
  *H04L 12/931* (2013.01)

(52) U.S. Cl.
  CPC .............. *H04L 49/20* (2013.01); *H04L 67/10* (2013.01); *H04L 12/4641* (2013.01); *H04L 2212/00* (2013.01)

(58) Field of Classification Search
  CPC . H04L 45/74; H04L 12/4641; H04L 12/4633; H04L 49/20; H04L 2212/00; H04L 45/306
  USPC ........................................................ 370/389
  See application file for complete search history.

(56) References Cited

U.S. PATENT DOCUMENTS

| | | | |
|---|---|---|---|
| 6,154,448 A | 11/2000 | Petersen et al. | |
| 6,772,211 B2 | 8/2004 | Lu et al. | |
| 6,880,089 B1 | 4/2005 | Bommareddy et al. | |
| 6,985,956 B2 | 1/2006 | Luke et al. | |
| 7,013,389 B1 | 3/2006 | Srivastava et al. | |
| 7,209,977 B2 | 4/2007 | Acharya et al. | |
| 7,239,639 B2 | 7/2007 | Cox et al. | |
| 7,379,465 B2 | 5/2008 | Aysan et al. | |
| 7,406,540 B2 | 7/2008 | Acharya et al. | |
| 7,447,775 B1 | 11/2008 | Zhu et al. | |
| 7,480,737 B2 | 1/2009 | Chauffour et al. | |
| 7,487,250 B2 | 2/2009 | Siegel | |
| 7,649,890 B2 | 1/2010 | Mizutani et al. | |
| 7,818,452 B2 | 10/2010 | Matthews et al. | |
| 7,898,959 B1 | 3/2011 | Arad | |
| 7,948,986 B1 | 5/2011 | Ghosh et al. | |
| 8,078,903 B1 | 12/2011 | Parthasarathy et al. | |
| 8,175,863 B1 | 5/2012 | Ostermeyer et al. | |
| 8,190,767 B1 | 5/2012 | Maufer et al. | |
| 8,201,219 B2 | 6/2012 | Jones | |
| 8,223,634 B2 | 7/2012 | Tanaka et al. | |
| 8,230,493 B2 | 7/2012 | Davidson et al. | |
| 8,266,261 B2 | 9/2012 | Akagi | |
| 8,451,735 B2 | 5/2013 | Li | |
| 8,484,348 B2 | 7/2013 | Subramanian et al. | |
| 8,521,879 B1 | 8/2013 | Pena et al. | |
| 8,615,009 B1* | 12/2013 | Ramamoorthi ....... | H04L 45/745 370/389 |
| 8,743,885 B2 | 6/2014 | Khan et al. | |
| 8,811,412 B2 | 8/2014 | Shippy | |
| 8,830,834 B2* | 9/2014 | Sharma .................. | H04L 45/64 370/235 |
| 8,832,683 B2 | 9/2014 | Heim | |
| 8,849,746 B2 | 9/2014 | Candea et al. | |
| 8,856,518 B2 | 10/2014 | Sridharan et al. | |
| 8,862,883 B2* | 10/2014 | Cherukuri ........... | H04L 41/0803 713/151 |
| 8,868,711 B2 | 10/2014 | Skjolsvold et al. | |
| 8,873,399 B2 | 10/2014 | Bothos et al. | |
| 8,892,706 B1 | 11/2014 | Dalal | |
| 8,914,406 B1 | 12/2014 | Haugsnes et al. | |
| 8,971,345 B1* | 3/2015 | McCanne ........... | H04L 47/6215 370/412 |
| 8,989,192 B2* | 3/2015 | Foo ..................... | H04L 47/2441 370/392 |
| 8,996,610 B1 | 3/2015 | Sureshchandra et al. | |
| 9,094,464 B1 | 7/2015 | Scharber et al. | |
| 9,104,497 B2 | 8/2015 | Mortazavi | |
| 9,148,367 B2 | 9/2015 | Kandaswamy et al. | |
| 9,191,293 B2 | 11/2015 | Iovene et al. | |
| 9,225,638 B2 | 12/2015 | Jain et al. | |
| 9,225,659 B2* | 12/2015 | McCanne ........... | H04L 47/6215 |
| 9,232,342 B2 | 1/2016 | Seed et al. | |
| 9,264,313 B1 | 2/2016 | Manuguri et al. | |
| 9,277,412 B2 | 3/2016 | Freda et al. | |
| 9,397,946 B1 | 7/2016 | Yadav | |
| 9,407,599 B2 | 8/2016 | Koponen et al. | |
| 9,479,358 B2 | 10/2016 | Klosowski et al. | |
| 9,503,530 B1 | 11/2016 | Niedzielski | |
| 9,531,590 B2 | 12/2016 | Jain et al. | |
| 9,602,380 B2 | 3/2017 | Strassner | |
| 9,686,192 B2 | 6/2017 | Sengupta et al. | |
| 9,686,200 B2 | 6/2017 | Pettit et al. | |
| 9,705,702 B2* | 7/2017 | Foo ........................ | H04L 45/74 |
| 9,755,898 B2 | 9/2017 | Jain et al. | |
| 9,755,971 B2 | 9/2017 | Wang et al. | |
| 9,774,537 B2 | 9/2017 | Jain et al. | |
| 9,787,605 B2 | 10/2017 | Zhang et al. | |
| 9,804,797 B1 | 10/2017 | Ng et al. | |
| 9,825,810 B2 | 11/2017 | Jain et al. | |
| 9,860,079 B2 | 1/2018 | Cohn et al. | |
| 9,900,410 B2 | 2/2018 | Dalal | |
| 9,935,827 B2 | 4/2018 | Jain et al. | |
| 9,979,641 B2 | 5/2018 | Jain et al. | |
| 9,985,896 B2 | 5/2018 | Koponen et al. | |
| 10,075,470 B2 | 9/2018 | Vaidya et al. | |
| 10,079,779 B2 | 9/2018 | Zhang et al. | |
| 10,104,169 B1 | 10/2018 | Moniz et al. | |
| 10,129,077 B2 | 11/2018 | Jain et al. | |
| 10,129,180 B2 | 11/2018 | Zhang et al. | |
| 10,135,737 B2 | 11/2018 | Jain et al. | |
| 10,212,071 B2 | 2/2019 | Kancherla et al. | |
| 10,225,137 B2 | 3/2019 | Jain et al. | |
| 10,257,095 B2 | 4/2019 | Jain et al. | |
| 10,320,679 B2 | 6/2019 | Jain et al. | |
| 10,341,233 B2 | 7/2019 | Jain et al. | |
| 2002/0097724 A1 | 7/2002 | Halme et al. | |
| 2002/0194350 A1 | 12/2002 | Lu et al. | |
| 2003/0065711 A1 | 4/2003 | Acharya et al. | |
| 2003/0093481 A1 | 5/2003 | Mitchell et al. | |
| 2003/0097429 A1 | 5/2003 | Wu et al. | |
| 2003/0105812 A1 | 6/2003 | Flowers et al. | |
| 2003/0236813 A1 | 12/2003 | Abjanic | |
| 2004/0066769 A1 | 4/2004 | Ahmavaara et al. | |
| 2004/0210670 A1 | 10/2004 | Anerousis et al. | |
| 2004/0215703 A1 | 10/2004 | Song et al. | |
| 2005/0091396 A1 | 4/2005 | Nilakantan et al. | |
| 2005/0114429 A1 | 5/2005 | Caccavale | |
| 2005/0132030 A1 | 6/2005 | Hopen et al. | |
| 2005/0198200 A1 | 9/2005 | Subramanian et al. | |
| 2005/0249199 A1 | 11/2005 | Albert et al. | |
| 2006/0069776 A1 | 3/2006 | Shim et al. | |
| 2006/0130133 A1 | 6/2006 | Andreev et al. | |
| 2006/0155862 A1 | 7/2006 | Kathi et al. | |
| 2006/0233155 A1 | 10/2006 | Srivastava | |
| 2007/0061492 A1 | 3/2007 | Riel | |
| 2007/0214282 A1 | 9/2007 | Sen | |
| 2007/0288615 A1 | 12/2007 | Keohane et al. | |
| 2008/0005293 A1 | 1/2008 | Bhargava et al. | |
| 2008/0031263 A1 | 2/2008 | Ervin et al. | |
| 2008/0046400 A1 | 2/2008 | Shi et al. | |
| 2008/0049614 A1 | 2/2008 | Briscoe et al. | |
| 2008/0049619 A1 | 2/2008 | Twiss | |
| 2008/0049786 A1 | 2/2008 | Ram et al. | |
| 2008/0072305 A1 | 3/2008 | Casado et al. | |
| 2008/0084819 A1 | 4/2008 | Parizhsky et al. | |
| 2008/0104608 A1 | 5/2008 | Hyser et al. | |
| 2008/0195755 A1 | 8/2008 | Lu et al. | |
| 2008/0225714 A1 | 9/2008 | Denis | |
| 2008/0239991 A1 | 10/2008 | Applegate et al. | |
| 2008/0247396 A1 | 10/2008 | Hazard | |
| 2008/0276085 A1 | 11/2008 | Davidson et al. | |
| 2008/0279196 A1 | 11/2008 | Friskney et al. | |
| 2009/0019135 A1 | 1/2009 | Eswaran et al. | |
| 2009/0063706 A1 | 3/2009 | Goldman et al. | |
| 2009/0129271 A1 | 5/2009 | Ramankutty et al. | |
| 2009/0172666 A1 | 7/2009 | Yahalom et al. | |
| 2009/0199268 A1 | 8/2009 | Ahmavaara et al. | |
| 2009/0235325 A1 | 9/2009 | Dimitrakos et al. | |
| 2009/0265467 A1 | 10/2009 | Peles et al. | |

(56) References Cited

U.S. PATENT DOCUMENTS

| | | |
|---|---|---|
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1* | 4/2010 | Bryson ............... H04L 63/0272 709/223 |
| 2010/0131638 A1 | 5/2010 | Kondamuru |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0090912 A1 | 4/2011 | Shippy |
| 2011/0164504 A1 | 7/2011 | Bothos et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1* | 12/2011 | Clark .................. H04L 12/4641 370/395.1 |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0185588 A1 | 7/2012 | Error |
| 2012/0207174 A1 | 8/2012 | Shieh |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0101226 A1 | 4/2014 | Khandekar et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0063364 A1 | 3/2015 | Thakkar et al. |
| 2015/0071301 A1 | 3/2015 | Dalal |
| 2015/0124840 A1 | 5/2015 | Bergeron |
| 2015/0146539 A1 | 5/2015 | Mehta et al. |
| 2015/0156035 A1* | 6/2015 | Foo ..................... H04L 47/2441 370/392 |
| 2015/0188770 A1 | 7/2015 | Naiksatam et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0288679 A1 | 10/2015 | Ben-Nun et al. |
| 2015/0372840 A1 | 12/2015 | Benny et al. |
| 2015/0372911 A1 | 12/2015 | Yabusaki et al. |
| 2015/0381494 A1 | 12/2015 | Cherian et al. |
| 2015/0381495 A1 | 12/2015 | Cherian et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0134528 A1 | 5/2016 | Lin et al. |

(56) References Cited

U.S. PATENT DOCUMENTS

| | | |
|---|---|---|
| 2016/0149816 A1 | 5/2016 | Roach et al. |
| 2016/0164787 A1 | 6/2016 | Roach et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0277210 A1 | 9/2016 | Lin et al. |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0352866 A1 | 12/2016 | Gupta et al. |
| 2016/0366046 A1 | 12/2016 | Anantharam et al. |
| 2017/0005920 A1 | 1/2017 | Previdi et al. |
| 2017/0005988 A1 | 1/2017 | Bansal et al. |
| 2017/0063683 A1 | 3/2017 | Li et al. |
| 2017/0063928 A1 | 3/2017 | Jain et al. |
| 2017/0126497 A1 | 5/2017 | Dubey et al. |
| 2017/0142012 A1 | 5/2017 | Thakkar et al. |
| 2017/0149582 A1 | 5/2017 | Cohn et al. |
| 2017/0149675 A1 | 5/2017 | Yang |
| 2017/0230467 A1 | 8/2017 | Salgueiro et al. |
| 2017/0295100 A1 | 10/2017 | Hira et al. |
| 2017/0310588 A1 | 10/2017 | Zuo |
| 2017/0317954 A1 | 11/2017 | Masurekar et al. |
| 2017/0364794 A1 | 12/2017 | Mahkonen et al. |
| 2017/0373990 A1 | 12/2017 | Jeuk et al. |
| 2018/0091420 A1 | 3/2018 | Drake et al. |
| 2018/0124061 A1 | 5/2018 | Raman et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0198692 A1 | 7/2018 | Ansari et al. |
| 2018/0213040 A1 | 7/2018 | Pak et al. |
| 2018/0234360 A1 | 8/2018 | Narayana et al. |
| 2018/0248986 A1 | 8/2018 | Dalal |
| 2018/0262434 A1 | 9/2018 | Koponen et al. |
| 2018/0278530 A1 | 9/2018 | Connor et al. |
| 2018/0302242 A1 | 10/2018 | Hao et al. |
| 2019/0020600 A1 | 1/2019 | Zhang et al. |
| 2019/0068500 A1 | 2/2019 | Hira |
| 2019/0132220 A1 | 5/2019 | Boutros et al. |
| 2019/0132221 A1 | 5/2019 | Boutros et al. |
| 2019/0149512 A1 | 5/2019 | Sevinc et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |

FOREIGN PATENT DOCUMENTS

| | | |
|---|---|---|
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |

OTHER PUBLICATIONS

Author Unknown, "Datagram," Jun. 22, 2012, 2 pages, retrieved from https://web.archive.org/web/20120622031055/https://en.wikipedia.org/wiki/datagram.

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, Cisco.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., U.S. Appl. No. 61/514,990, filed Aug. 4, 2011.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 16/005,628, filed Jun. 11, 2018, 44 pages, Nicira, Inc.

Non-Published Commonly Owned U.S. Appl. No. 16/005,636, filed Jun. 11, 2018, 45 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Yvas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," Proc. of SIGCOMM '12, Aug. 13-17, 2012, 12 pages, Helsinki, Finland.

* cited by examiner

METHOD AND SYSTEM FOR SERVICE SWITCHING USING SERVICE TAGS

CLAIM OF BENEFIT TO PRIOR APPLICATIONS

This application is a continuation application of U.S. patent application Ser. No. 14/960,441, filed Dec. 7, 2015, now issued as U.S. Pat. No. 9,979,641. U.S. patent application Ser. No. 14/960,441 is a continuation application of U.S. patent application Ser. No. 13/891,025 filed May 9, 2013, now issued as U.S. Pat. No. 9,225,638. U.S. Pat. Nos. 9,979,641 and 9,225,638 are incorporated herein by reference.

BACKGROUND

The exponential growth of the Internet has made it a ubiquitous delivery medium for a variety of applications. Such applications, in turn, have brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, virtual machines for different customer can coexist in the same physical host. This multi-tenancy capability allows service providers to partition and isolate physical resources (e.g., computing power and network capacity) according to customer needs, and to allocate such resources dynamically.

While virtualization brings unprecedented flexibility to service providers, the conventional multi-tenancy tends to be rigid and cannot readily accommodate the dynamic nature of traffic generated by virtual machines. For example, efficiently addressing diverse service requirements of traffic from a plurality of multi-tenant customers (or clients) with different service requirements can be challenging. To obtain service for its traffic, a virtual machine typically interacts with one or more physical or virtual equipments (can be referred to as service portals). A service portal can provide specific networking services, such as load balancing and firewall service etc, and application services, such as web proxy, mail proxy, authentication proxy, web caching, content proxy etc. In conventional datacenter environments, this interaction can be enabled by configuring the services at several management stations in the network.

One or more service portals can provide a service within or outside of the datacenter environment. Consequently, the network infrastructure comprising switches and routers in the datacenter environment requires service switching for multiple services to reach the desired portals. Service switching refers to the switching of a packet based on its service requirements to a service portal. With today's dynamic nature of the datacenter service and policy deployment, such service switching is an increasingly difficult task.

Because of multi-tenancy, the same network infrastructure is used for forwarding traffic flow belonging to different clients. Traffic for a respective client can be originated from a number of applications running on different virtual machines. Furthermore, different clients may require the network infrastructure to forward traffic belonging to the same application differently. For example, in a multi-tenant environment, the network infrastructure may need to forward web traffic from one client to a web filtering service portal while bypassing web filtering for a second client. In a conventional datacenter, the ability to switch traffic based on the corresponding requested services is typically based on static routing policies toward appliances dedicated for services in the network infrastructure. Consequently, managing and extensive provisioning of individual devices in a network infrastructure to accommodate such diverse service requirements can be tedious and error-prone.

SUMMARY

The disclosure herein describes a system, which provides service switching in a datacenter environment. During operation, the system identifies a source client and a requested service of a received packet and generates a service tag indicating the source client, the requested service, or both. The system forwards the packet and the service tag toward a service switching gateway, thereby allowing the service switching gateway to switch the packet based on the service tag. The system can encapsulate the packet based on the identified source client and the requested service of the packet, incorporates the service tag in the packet encapsulation, and forwards the packet is based on the encapsulation.

The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a requested service, the service portal, and a tunnel encapsulation. The service switching gateway can encapsulate the packet based on an encapsulation mechanism supported by the service portal and forward the packet based on the mapping.

Additionally, upon providing the service to the packet, the service portal can forward the packet back to the service switching gateway. The service switching gateway receives the packet, reconstructs the service tag for the packet, and forwards the packet back to its origination switch. The system can use Generic Routing Encapsulation (GRE) tunneling, Internet Protocol Security (IPsec) tunneling, Virtual Local Area Network (VLAN) encapsulation, and/or Internet Protocol (IP) for encapsulation. The system uses a GRE key, an IPsec Security Parameter Index (SPI), a VLAN tag, and/or IP header options as the corresponding service tag.

BRIEF DESCRIPTION OF FIGURES

In the figures, like reference numerals refer to the same figure elements.

DETAILED DESCRIPTION

Figure 1A:
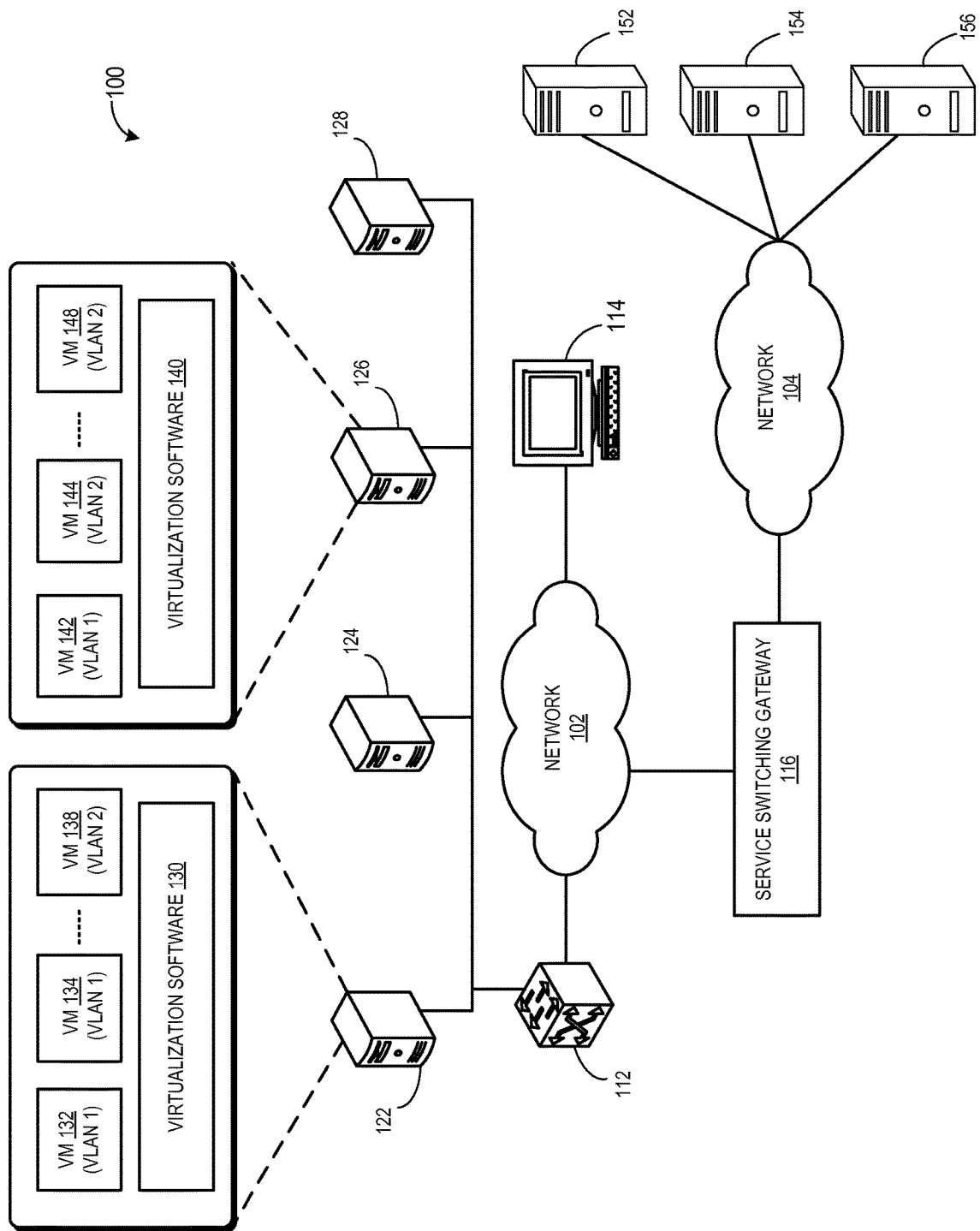
FIG. 1A illustrates an exemplary datacenter environment that facilitates dynamic service switching.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of dynamically facilitating services to a packet in a multitenant datacenter environment by attaching a service tag to the packet based on its service requirements and switching the packet using the service tag. Because of multi-tenancy, the same network infrastructure of the datacenter environment is used to forward traffic flow belonging to different clients. With existing technologies, standard network protocol stack (e.g., layer-2 and layer-3 of the stack) is typically used by a client in a multi-tenant datacenter environment. For example, the client typically uses its own virtual local area network (VLAN) and Internet Protocol (IP) sub-network (subnet) corresponding to a specific range of IP addresses. As a result, the network protocol stack may not be available for associating virtual machines of different clients with different service requirements. Because different services can be provided from different service portals within or outside of the datacenter, the network infrastructure of the datacenter is burdened with selecting the appropriate service portal. Managing individual devices in the network infrastructure to accommodate such diverse service provisioning can be tedious and error-prone.

To solve this problem, a respective packet in a datacenter environment is associated with a service tag which indicates the source client of the packet and/or the service the packet requires. The client to which the originating virtual machine of the packet belongs is the source client of the packet. In some embodiments, upon receiving the packet, a switch, which can be the first-hop switch, determines the source client, and the requested service and creates the service tag. The switch then encapsulates the packet, includes the service tag as a part of the encapsulation, and sends the encapsulated packet to a service switching gateway. Because this switch originates the service switching in the datacenter environment, the switch can be referred to as the origination switch. The service switching gateway uses the service tag to identify service portal capable of providing the requested service to the packet. In some embodiments, the encapsulation is based on a generic encapsulation mechanism. Upon receiving the packet and the service tag, the service switching gateway decapsulates the packet, identifies the source client and the requested service from the service tag, and forwards the packet to a service portal based on the determination. In some embodiments, the service switching gateway can use a generic encapsulation mechanism to forward the packet to a service portal.

FIG. 1A illustrates an exemplary datacenter environment that facilitates dynamic service switching. Datacenter environment 100 includes a number of host machines 122, 124, 126, and 128. A respective host machine can host a plurality of virtual machines running on virtualization software. For example, host machine 122 and 126 run virtualization software 130 and 140, respectively. A number of virtual machines 132, 134, and 138 run on virtualization software 130, and a number of virtual machines 142, 144, and 148 run on virtualization software 140. In this example, virtual machines 132, 134, and 142 belong to VLAN 1, which is associated with one customer, and virtual machines 138, 144, and 148 belong to VLAN 2, which is associated with another customer.

Datacenter environment 100 also includes a policy server 114, which allows a network administrator to provide service policies regarding different clients and the requested services for different traffic flow type from a respective client. Policy server 114 sends these service policies to an origination switch 112 and a service switching gateway 116 via network 102. In this example, originating switch 112 operates as the origination point of service switching in datacenter environment 100. Note that virtualization software 130 and 140, and/or any networking device in network 102 can operate as an origination point of service switching in datacenter environment 100. Service switching gateway 116 is coupled to service portals 152, 154, and 156 via network 104.

Networks 102 and 104 can be local or wide area networks comprising layer-2 (e.g., Ethernet), layer-3 (e.g., IP), and/or any other networking layers. In some embodiments, networks 102 and 104 are parts of the same network (e.g., same local or wide area network). Based on the service policies received from policy server 114, switch 112 configures forwarding policies by determining which traffic flow type (e.g., web, mail, file transfer, etc) from a client requires which service. Similarly, based on the service policies, service switching gateway 116 configures service switching policies by determining which service portal should the traffic flow be directed to.

During operation, virtual machine 132 generates a packet. The term "packet" refers to a group of bits that can be transported together across a network. "Packet" should not be interpreted as limiting embodiments of the present invention to any specific networking layer. "Packet" can be replaced by other terminologies referring to a group of bits, such as "frame," "message," "cell," or "datagram." Switch 112 receives the packet and determines the source client (i.e., the client to which virtual machine 132 belong) of the packet. Switch 112 can detect the source client based on membership to VLAN 1, an associated subnet and a corresponding IP address range, a source (physical or virtual) port, or any point of attachment between virtual machine 132 and switch 112. Switch 112 also detects the traffic flow type of the packet. Switch 112 can inspect headers of one or more layers (e.g., Ethernet and IP) to determine the traffic flow type. For example, if the packet includes a destination Transmission Control Protocol (TCP) port 80, the packet can be considered as part of a web traffic flow.

Based on the identified source client and the traffic flow type, switch 112 determines the requested service for the packet. Not all clients may require all services. For example, one client may require a web filtering service for all packets while another client may not require any web filtering service. If the packet from virtual machine 132 requires any service, switch 112 creates a service tag, which indicates the source client, the requested service for the packet, or both. Switch 112 then attaches the service tag with the packet and sends the packet to service switching gateway 116 via one or more hops through network 102. In some embodiments, switch 112 encapsulates the packet using a generic encapsulation mechanism and attaches the service tag as a part of the encapsulation. Examples of packet encapsulation include, but are not limited to, Generic Routing Encapsulation (GRE) tunneling, Internet Protocol Security (IPsec) tunneling, VLAN encapsulation, and IP encapsulation. Examples of corresponding service tag include, but are not limited to, a GRE key, Security Parameter Index (SPI), VLAN tag, and IP header options. If the packet does not require any service, switch 112 forwards the packet based on the destination information in the header of the packet.

Service switching gateway 116 terminates packet encapsulation from switch 112. Because the networking devices in network 102 forwards the packet based on the encapsulation, these devices do not need any modification to assist service switching. Upon receiving the packet and the service tag, service switching gateway 116 extracts the service tag and identifies the source client, the requested service, or both from the service tag. Suppose that service portal 152 can provide the requested service to the packet. Based on the identification, service switching gateway 116 selects service portal 152 for providing the service to the packet. Service switching gateway 116 then sends the packet to service portal 152 via one or more hops through network 104. In some embodiments, service switching gateway 116 encapsulates the packet based on a generic encapsulation mechanism supported by both service switching gateway 116 and service portal 152. After providing the service, service portal 152 can either forward the packet based on the destination information of the packet or send the packet back to service switching gateway 116. Upon receiving the packet back, service switching gateway 116 attaches the tag back to the packet and sends the packet back to switch 112.

Figure 1B:
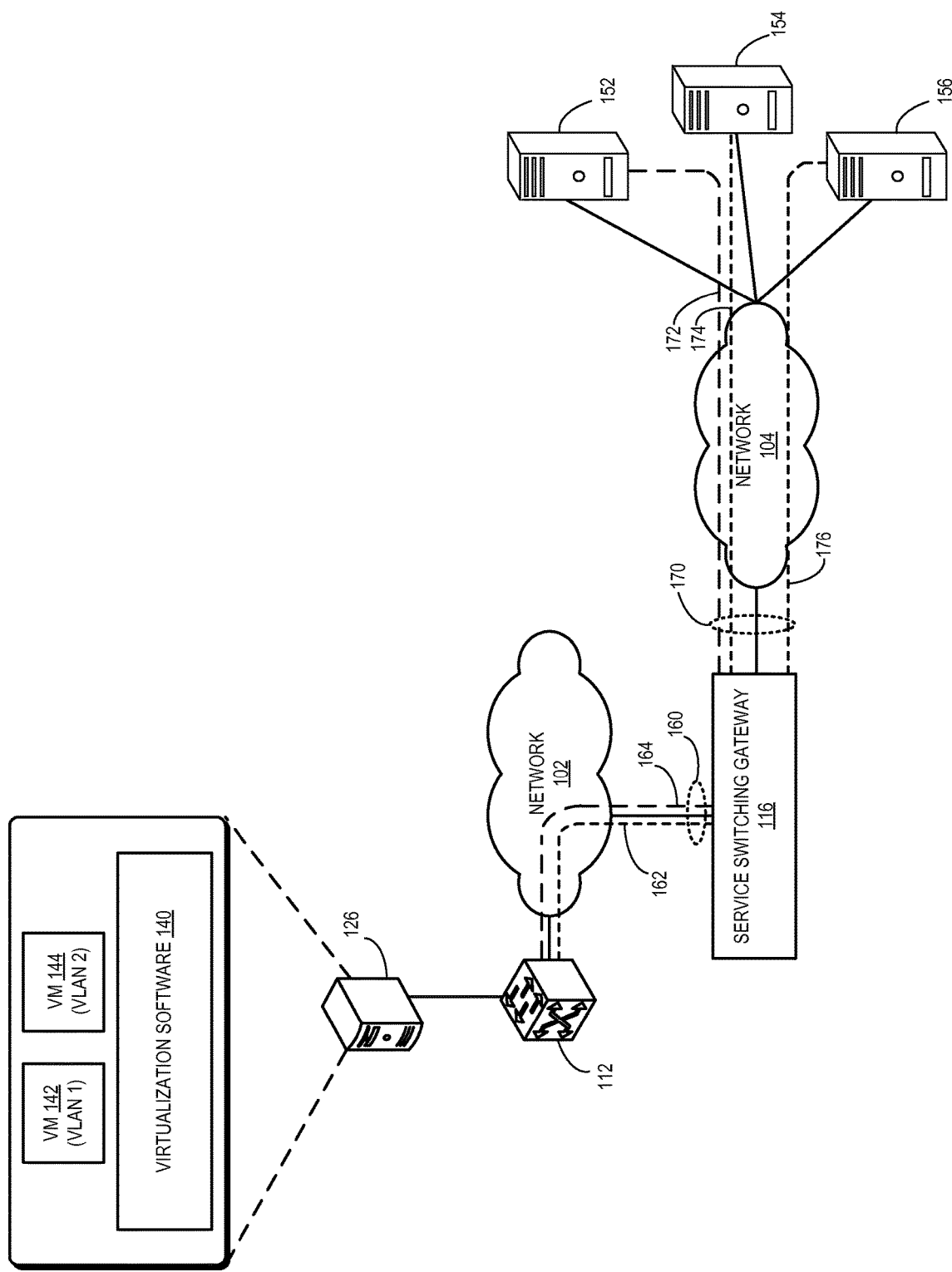
FIG. 1B illustrates encapsulation-based dynamic service switching in conjunction with the example in FIG. 1A.

Note that service switching gateway 116 can have packet encapsulation with switch 112 and service 152 using different encapsulation mechanisms. Service switching gateway 116 uses the service tag in the tunnel encapsulation to switch/steer the packet to corresponding service portal 152. FIG. 1B illustrates encapsulation-based dynamic service switching in conjunction with the example in FIG. 1A. In the example in FIG. 1B, during operation, switch 112 receives packets from virtual machines 142 and 144, which belong to different clients (denoted by different VLANs). Switch 112 establishes one or more forwarding encapsulation tunnels 160 with service switching gateway 116 for forwarding packets from virtual machines 142 and 144. An encapsulation tunnel encapsulates a packet between the origination and termination points of the tunnel.

In some embodiments, based on the customer requirements, service policies specify whether to use the same tunnel for multiple clients or use different tunnels for different clients. Consequently, switch 112 and service switching gateway 116 can have different tunnels for different clients based on the service policies. For example, switch 112 forwards packets from virtual machine 142 via tunnel 162 while forwards packets from virtual machine 144 via tunnel 164. Tunnel 162 and 164 can be based on different encapsulation mechanisms, wherein the service tag formats for tunnel 162 and 164 correspond to the respective encapsulation mechanism. For example, if tunnel 162 is an IPSec tunnel while tunnel 164 is a GRE tunnel, the service tags for all packets forwarded via tunnel 162 are IPSec SPIs and for all packets forwarded via tunnel 164 are GRE keys.

On the other hand, service switching gateway 116 establishes one or more service encapsulation tunnels 170 with service portals 152, 154, and 156 for forwarding packets based on their service requirements. In some embodiments, based on the encapsulation mechanisms supported by a respective service portal, service policies specify which encapsulation mechanism to use for establishing an encapsulation tunnel with a service portal. Service switching gateway 116 and service portals 152, 154, and 156 have tunnels 172, 174, and 176, respectively, between them. Tunnels 172, 174, and 176 can be based on different encapsulation mechanism. For example, tunnel 172 can be a GRE tunnel while tunnels 174 and 176 can be IPSec tunnels.

During operation, switch 112 receives a packet, which requires a service from service portal 152, from virtual machine 142. Switch 112 creates a service tag, which is an IPSec SPI, specifying the source client to which virtual machine 142 belongs. The service tag can also include a requested service, which is the service provided by service portal 152. Switch 112 then encapsulates the packet in IPSec tunneling format, includes the generated IPSec SPI in the encapsulation, and forwards the encapsulated packet to service switching gateway 116 via tunnel 162. Intermediate networking devices in network 102 forwards the packet based on the encapsulation. Upon receiving the encapsulated packet, service switching gateway 116 decapsulates the packet, extracts the IPSec SPI (i.e., the service tag), and identifies the source client and/or the requested service.

In some embodiments, service switching gateway 116 maintains a service mapping between the requested service and/or the source client, and the associated service portal 152. Based on the service mapping, identified the source client, and/or requested service, service switching gateway 116 determines service portal 152 as the service destination. Service switching gateway 116 then encapsulates the packet in GRE tunneling format and forwards the encapsulated packet to service portal 152 via tunnel 172. Upon receiving the encapsulated packet, service portal 152 decapsulates the packet and provides the requested service to the packet. In some embodiments, service switching gateway 116 specifies the requested service by regenerating the service tag as a GRE key and incorporates the GRE key in the packet encapsulation. Upon receiving the packet, service portal 152 extracts the service tag and identifies the requested service for the packet. This can be useful when service portal 152 can provide multiple services.

Figure 2:
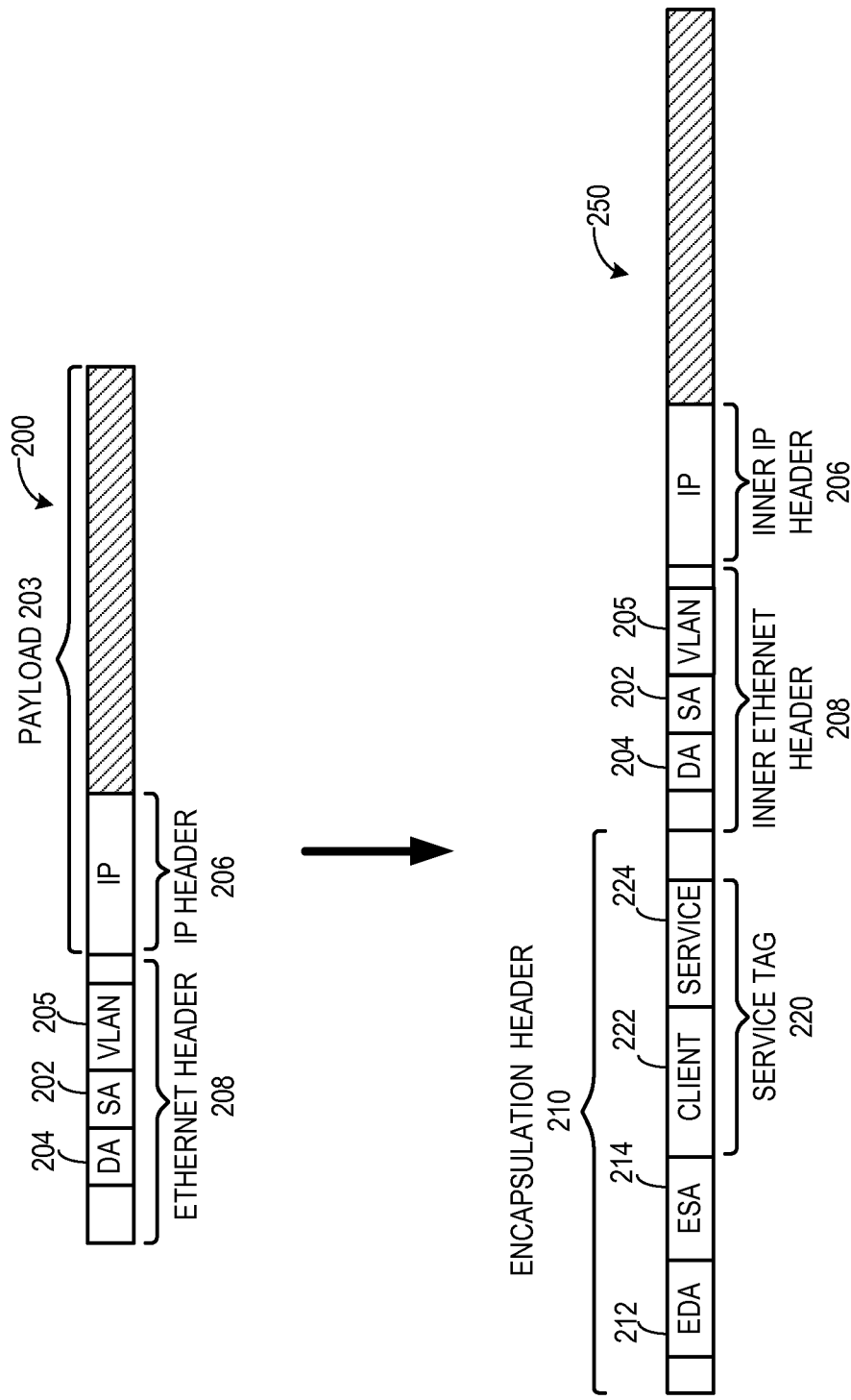
FIG. 2 illustrates header format for a conventional packet and its tunnel encapsulation of dynamic service switching.

FIG. 2 illustrates header format for a conventional packet and its tunnel encapsulation of dynamic service switching. In this example, a conventional Ethernet packet 200 typically includes a payload 203 and an Ethernet header 208. Typically, payload 203 can include an IP packet which includes an IP header 206. Ethernet header 208 includes a media access control (MAC) destination address (DA) 204, a MAC source address (SA) 202, and optionally a VLAN tag 205.

In one embodiment, switch 112 can encapsulate conventional packet 200 into an encapsulated packet 250. Encapsulated packet 250 typically includes an encapsulation header 210, which corresponds to the encapsulation mechanism. Encapsulation header 210 contains an encapsulation DA 212 and an encapsulation SA 214. The encapsulated packet is forwarded via network 102 based on encapsulation DA 212. Encapsulation header 210 also includes a service tag 220, which indicates the source client 222, a requested service 224 for packet 200, or both. For example, if encapsulation header 210 corresponds to an IPSec tunnel, a GRE tunnel, or a VLAN encapsulation, service tag 220 is an IPSec SPI, a GRE key, or a VLAN tag, respectively.

Take, for example, packet 200 is a web request to a web server generated by virtual machine 142. Typically, an upper layer application in virtual machine 142 generates an IP packet destined for the web server, using web server's IP address. This IP packet becomes payload 203, and the web server's IP address becomes the destination IP address in IP header 206. In addition, virtualization software 140's IP address becomes the source IP address in IP header 206. The layer-2 in virtual machine 142 then generates Ethernet header 208 to encapsulate payload 203. MAC DA 204 of Ethernet header 208 is assigned the default gateway router's MAC address. For example, if switch 112 is the gateway router, MAC DA 204 of Ethernet header 208 is switch 112's MAC address. MAC SA 202 of Ethernet header 208 is virtual machine 142's MAC address. Virtual machine 142 then sends Ethernet packet 200 to switch 112.

When switch 112 receives Ethernet packet 200 from virtual machine 142, switch 112 inspects the Ethernet MAC DA 204, MAC SA 202, VLAN tag 205, and optionally IP header 206 and its payload (e.g., the layer-4 header). Based on this information, switch 112 determines that Ethernet packet 200 is associated with web service and requires a service from service portal 152. Subsequently, switch 112 assembles the encapsulation header 210, attaches service tag 220 (corresponding to an encapsulation mechanism), and forwards packet 220 to service switching gateway 116. Upon receiving packet 220, service switching gateway 116 removes encapsulation header 210 and extracts service tag 220. Service switching gateway 116 then assembles another encapsulation header for the packet and forwards the encapsulated packet to service portal 152.

Figure 3:
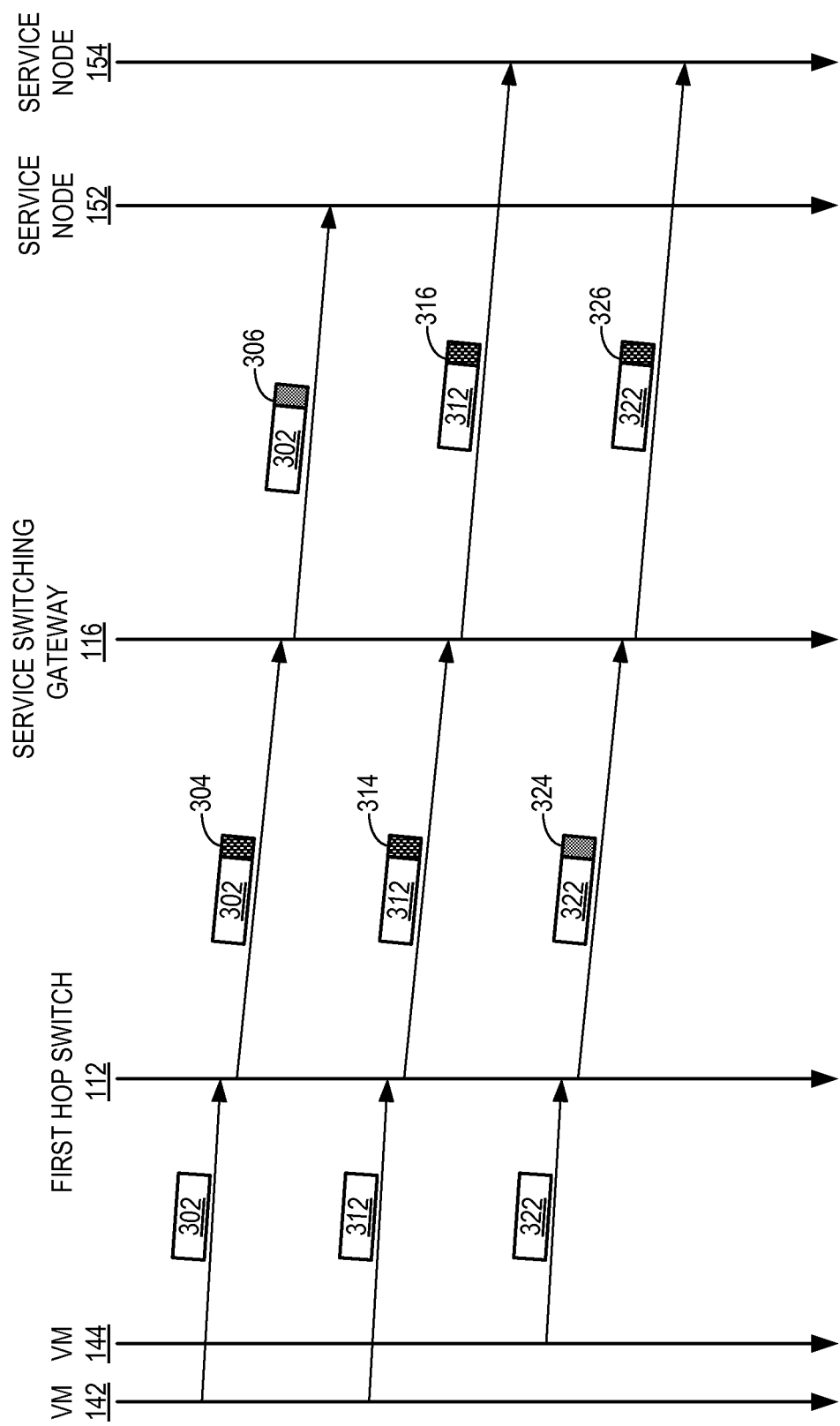
FIG. 3 presents a time-space diagram illustrating an exemplary dynamic service switching process in a datacenter environment.

As mentioned above, when virtual machine 142 sends a packet to the web server, the packet is switched to a service portal. FIG. 3 presents a time-space diagram illustrating an exemplary dynamic service switching process in a datacenter environment. During operation, switch 112 receives packet 302, which requires a service from service portal 152, from virtual machine 142. Switch 112 creates a service tag specifying the source client to which virtual machine 142 belongs and a requested service, which is the service provided by service portal 152. Switch 112 then encapsulates packet 302 in encapsulation header 304, includes the generated service tag in encapsulation header 304, and forwards encapsulated packet 302 to service switching gateway 116. Upon receiving encapsulated packet 302, service switching gateway 116 decapsulates packet 302, extracts the service tag from encapsulation header 304, and identifies the source client and/or the requested service. Based on the identified the source client and/or the requested service, service switching gateway 116 determines service portal 152 as the service destination. Service switching gateway 116 then encapsulates packet 302 in another encapsulation header 306 and forwards encapsulated packet 302 to service portal 152. Note that encapsulation headers 304 and 306 can be based on different encapsulation mechanism.

Switch 112 can receive another packet 312, which requires a service from service portal 154, from virtual machine 142. Switch 112 encapsulates packet 312 in encapsulation header 314, includes a corresponding service tag in encapsulation header 314, and forwards encapsulated packet 312 to service switching gateway 116. However, based on the service policies associated with a client, switch 112 can use a different encapsulation mechanism for that client. In this example, when switch 112 receives packet 322, which requires a service from service portal 154, from virtual machine 144 belonging to a different client, switch 112 encapsulates packet 322 in encapsulation header 324, which is based on a different encapsulation mechanism than encapsulation headers 304 and 314. Switch 112 then includes a corresponding service tag in encapsulation header 324, and forwards encapsulated packet 322 to service switching gateway 116.

Upon receiving encapsulated packets 312 and 322, service switching gateway 116 decapsulates packets 312 and 322, extracts the service tag from encapsulation headers 314 and 324, respectively, and identifies the source client and/or the requested service. Based on the identified the source client and/or the requested service and a service mapping, service switching gateway 116 determines service portal 154 as the service destination. Service switching gateway 116 then encapsulates packets 312 and 322 in encapsulation headers 316 and 326, respectively, and forwards encapsulated packets 312 and 322 to service portal 154. Encapsulation headers 304 and 306 can be based on the same encapsulation mechanism even though they are generated at different locations.

Figure 4A:
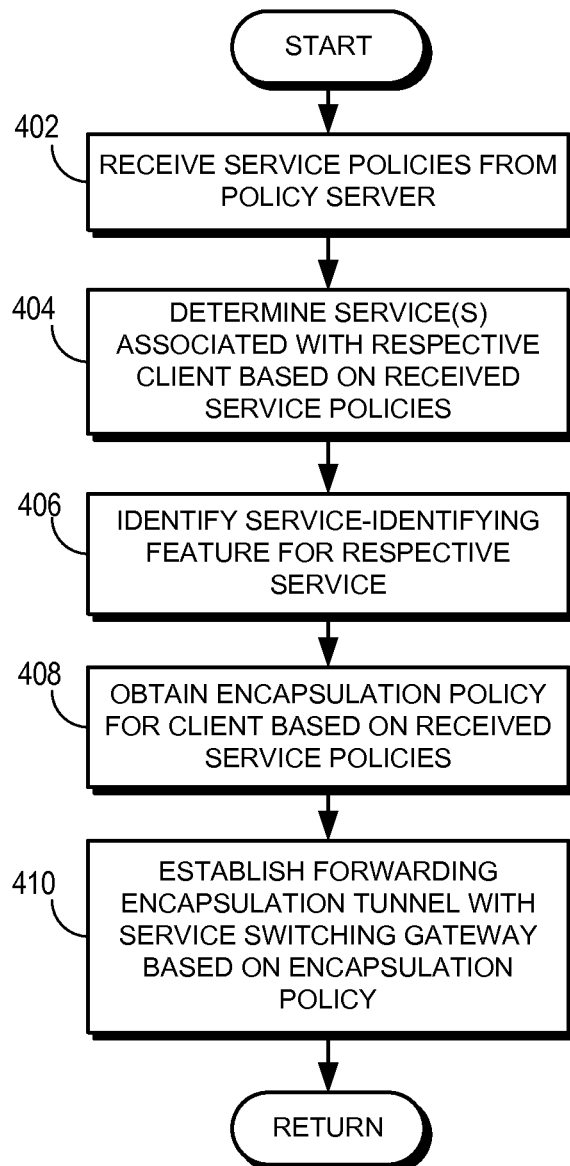
FIG. 4A presents a flow chart illustrating an exemplary process of an origination switch configuring forwarding policies in a datacenter environment based on service requirements.

FIG. 4A presents a flow chart illustrating an exemplary process of an origination switch configuring forwarding policies in a datacenter environment based on service requirements. During operation, the switch receives service policies from a policy server (operation 402), as described in conjunction with FIG. 1A. The switch then determines the service(s) associated with a respective client based on the received service policies (operation 404). The switch also identifies service-identifying features of a respective service (operation 406). For example, service-identifying feature of web filtering can be determining whether a packet includes a destination TCP port 80. The switch obtains encapsulation policy for a respective client based on the received service policies (operation 408). An encapsulation policy dictates the supported encapsulation mechanisms, and which mechanism should be used under which circumstance. For example, a client may require a separate tunnel for forwarding its packets, as described in conjunction with FIG. 1B. The switch then establishes a forwarding encapsulation tunnel with a service switching gateway based on the encapsulation policy (operation 410).

Figure 4B:
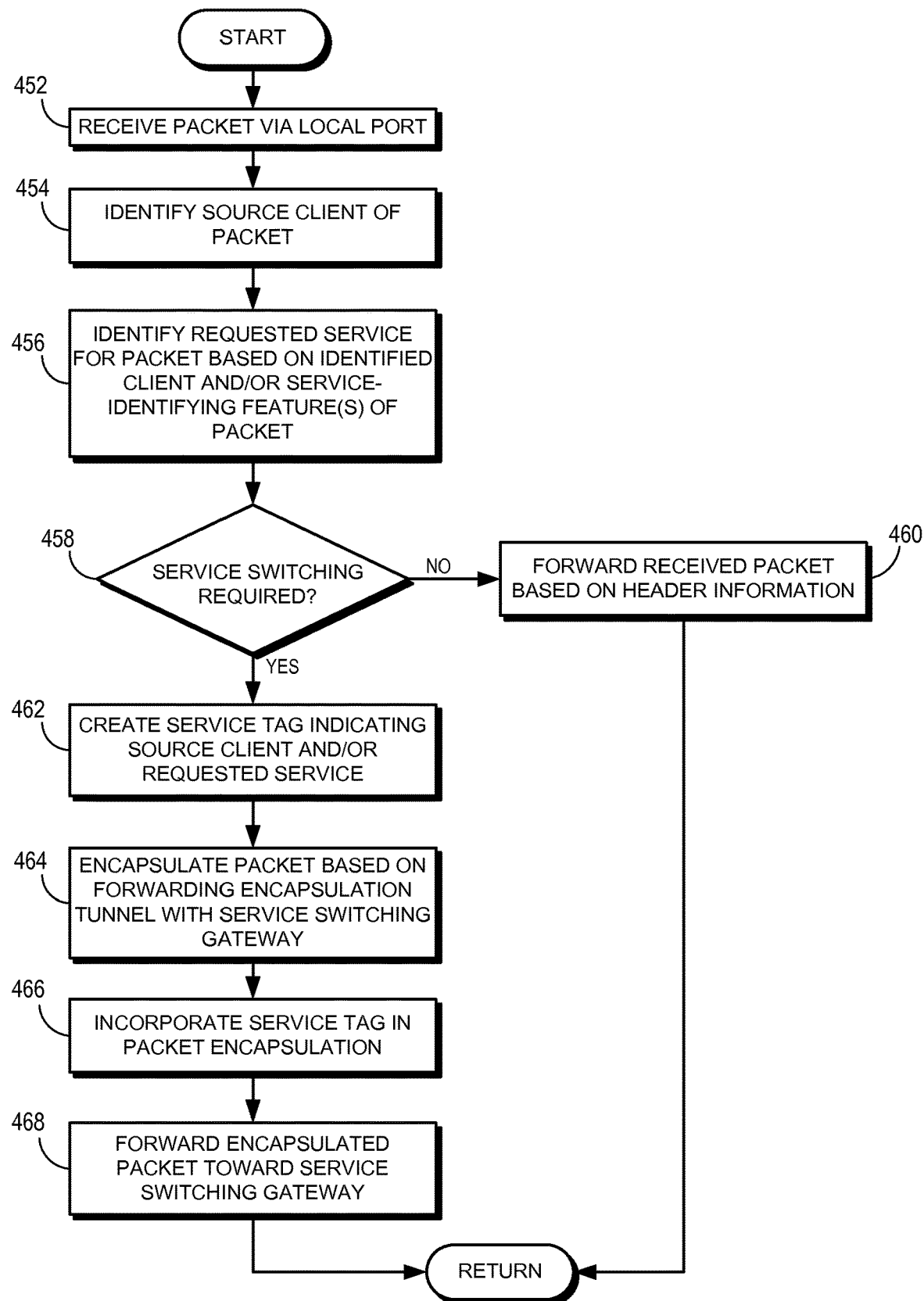
FIG. 4B presents a flow chart illustrating an exemplary process of an origination switch forwarding a packet in a datacenter environment.

FIG. 4B presents a flow chart illustrating an exemplary process of an origination switch forwarding a packet in a datacenter environment. Upon receiving a packet via a local port (operation 452), the switch identifies the source client of the packet (operation 454). In some embodiments, the switch detects the source client based on membership to a VLAN, an associated subnet and a corresponding IP address range, a source (physical or virtual) port, or any point of attachment with the client. The switch then identifies the service requested for the packet based on the identified client and service-identifying feature(s) of the packet (operation 456). The switch then checks whether the packet requires service switching based on the service policies, as described in conjunction with FIG. 4A (operation 458).

If the packet requires service switching, the switch creates a service tag indicating the source client and/or the requested service for the packet (operation 462). The switch encapsulates the packet based on the forwarding tunnel with a service switching gateway (operation 464). Note that this forwarding tunnel can be client-specific. The switch incorporates the service tag in the packet encapsulation (operation 466) and forwards the encapsulated packet toward the service switching gateway (operation 468). If the packet does not require service switching, the switch forwards the packet based on its header information (operation 460).

Figure 5A:
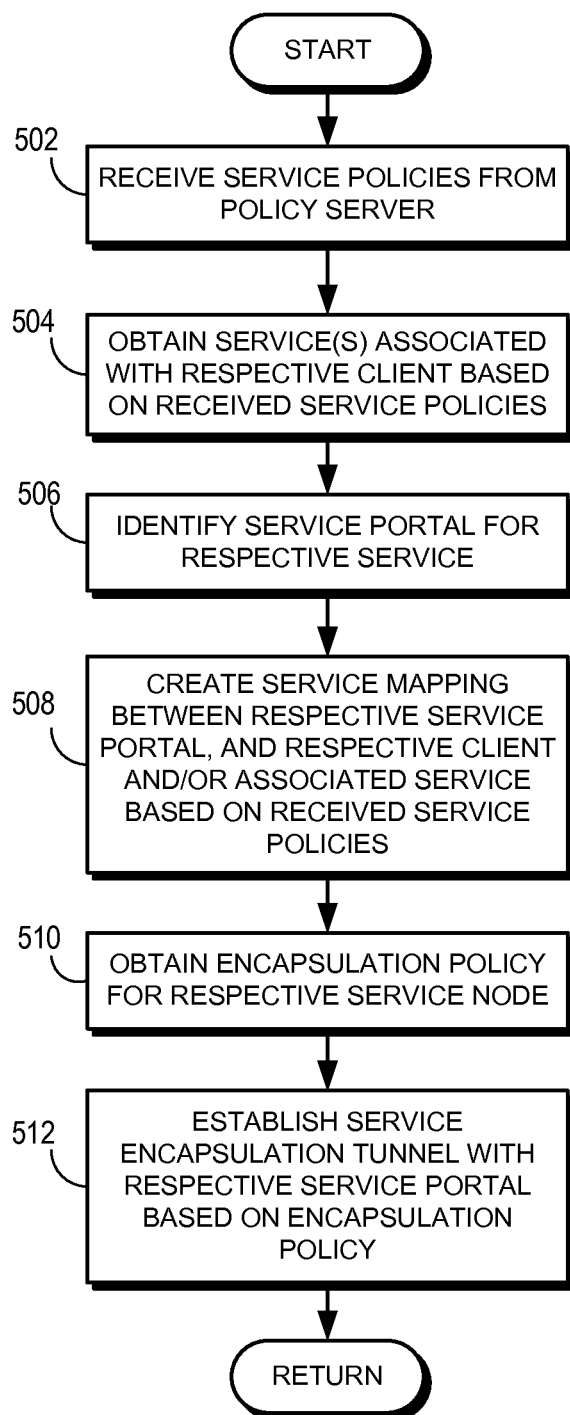
FIG. 5A presents a flow chart illustrating an exemplary process of a service switching gateway configuring service switching policies in a datacenter environment.

FIG. 5A presents a flow chart illustrating an exemplary process of a service switching gateway configuring service switching policies in a datacenter environment. During operation, the service switching gateway receives service policies from a policy server (operation 502), as described in conjunction with FIG. 1A. The service switching gateway then determines the service(s) associated with a respective client based on the received service policies (operation 504). The service switching gateway identifies service portal for a respective service (operation 506) and creates a service mapping between a respective service portal and a respective client and/or associated service based on the received service policies (operation 508). The service switching gateway obtains encapsulation policy for a respective service portal (operation 510) and establishes a service encapsulation tunnel with a respective service portal based on the encapsulation policy (operation 512).

Figure 5B:
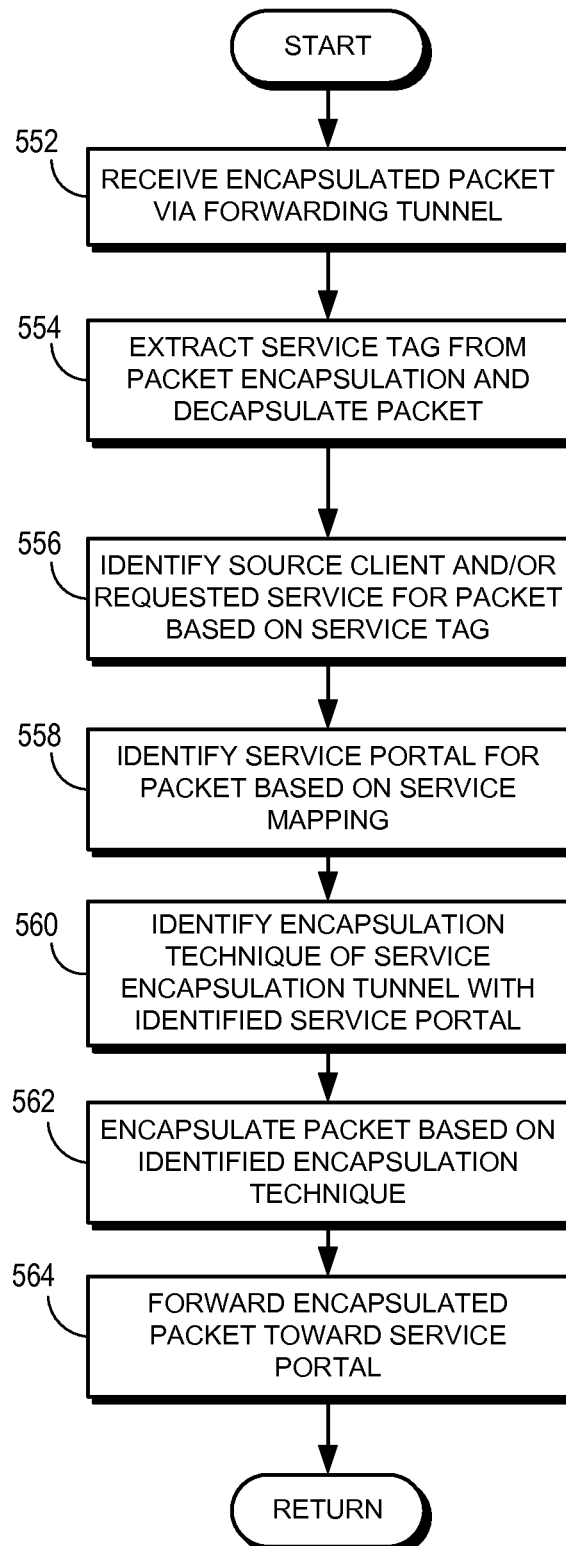
FIG. 5B presents a flow chart illustrating an exemplary process of a service switching gateway forwarding a packet in a datacenter environment based on service requirements.

FIG. 5B presents a flow chart illustrating an exemplary process of a service switching gateway forwarding a packet in a datacenter environment based on service requirements. Upon receiving a packet via a forwarding tunnel (operation 552), the service switching gateway extracts the service tag from the packet encapsulation and decapsulate the packet (operation 554) and identifies the source client and/or a requested service associated with the packet based on the service tag (operation 556). The service switching gateway identifies the service portal for the packet based on the service mapping in the service switching gateway (operation 558) and the encapsulation mechanism of service encapsulation tunnel with the identified service portal (operation 560). Note that this service encapsulation tunnel can be service-specific. The switch encapsulates the packet based on the identified encapsulation mechanism (operation 562) and forwards the encapsulated packet toward the identified service portal (operation 564).

Figure 6:
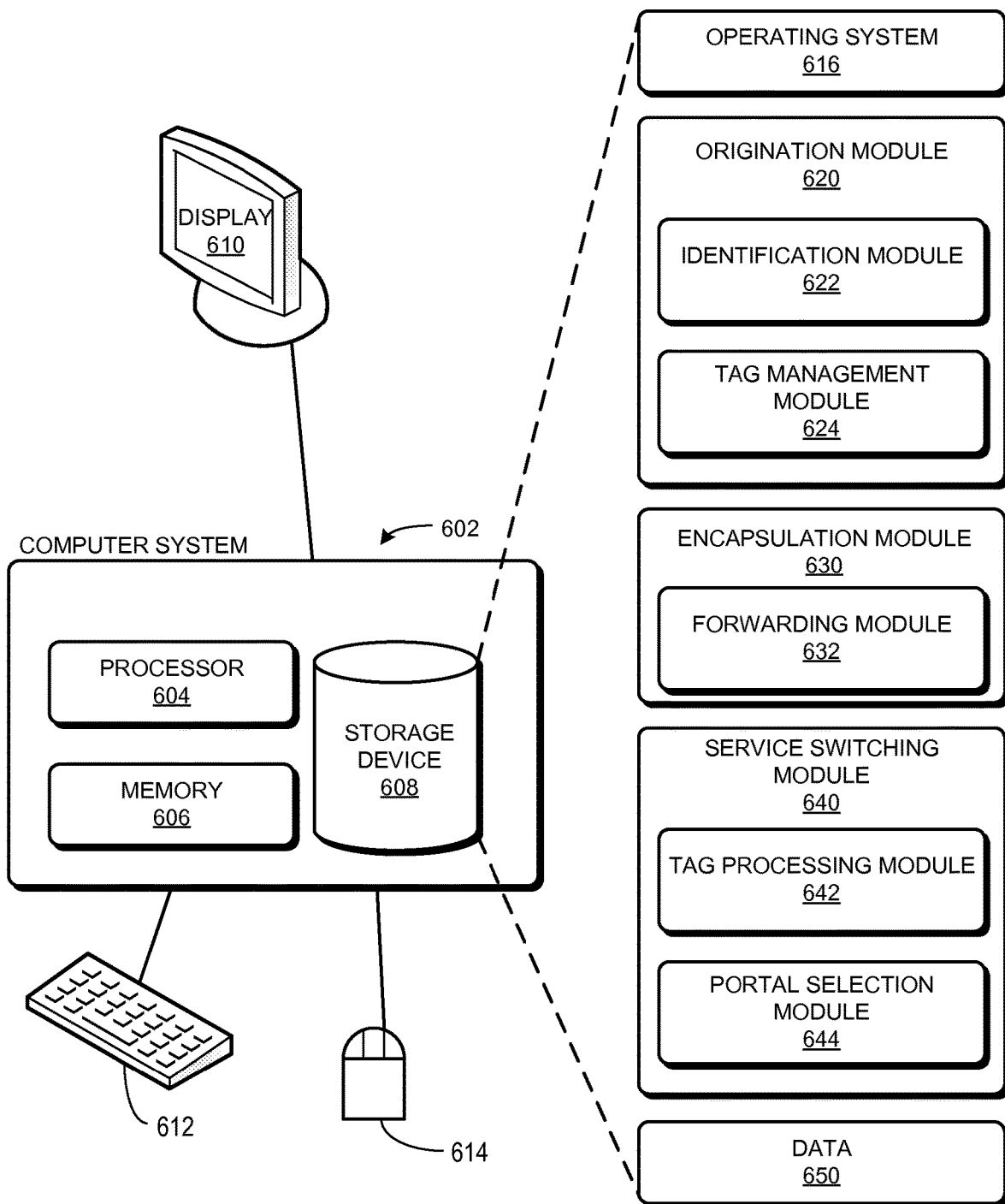
FIG. 6 illustrates an exemplary service switching gateway.

It should be noted that the service switching gateway described herein can be implemented as a stand-alone appliance, as part of a switch or router, or as part of a host machine. Furthermore, the service switching gateway can be implemented in hardware or software, or a combination of both. FIG. 6 illustrates an exemplary service switching gateway. In this example, a computer system 602 includes a processor 604, memory 606, and a storage device 608. Computer system 602 is also coupled to a display 610, a keyboard 612, and a pointing device 614. Storage device 608 stores data 650 and instructions which when loaded into memory 606 and executed by processor 604 implement an operating system 616, an origination module 620, an encapsulation module 630, and an service switching module 640. Origination module 620 includes an identification module 622 and a tag management module 624. Encapsulation module 630 includes a forwarding module 632. Service switching module 640 includes a tag processing module 642 and a portal selection module 644. When executed by the processor, these modules jointly or separately perform the functions described above.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory machine readable medium storing a program for specifying a service to perform on a received packet, the program for execution by at least one hardware processing unit, the program comprising sets of instructions for:

identifying a source client and a requested service associated with the received packet;

generating a service tag that identifies the source client and the requested service;

storing the service tag in an encapsulation header, and using the encapsulation header with the stored service tag to encapsulate the packet; and forwarding the encapsulated packet to a service switching gateway that extracts the service tag from the encapsulation header and directs the packet to a service machine by using the extracted service tag to identify the service machine from a mapping structure that maps different service tags to different service machines.

2. The non-transitory machine readable medium of claim 1, wherein as the service tag identifies both the source client and the requested service, the service switching gateway identifies the service machine based on the source client and the requested service associated with the packet.

3. The non-transitory machine readable medium of claim 1, wherein the packet originates from a virtual machine executing on a host computer, and the program is executed by a device that is different than the host computer.

4. The non-transitory machine readable medium of claim 1, wherein the packet originates from a virtual machine executing on a host computer, and the program executes on the host computer.

5. The non-transitory machine readable medium of claim 1, wherein the packet is sent by a machine operating in a multi-tenant datacenter, and the identified source client is a tenant.

6. The non-transitory machine readable medium of claim 1, wherein the service tag comprises one or more of: a GRE key, an IPSec Security Parameter Index (SPI), a VLAN tag, and IP header options.

7. The non-transitory machine readable medium of claim 1, wherein the service switching gateway directs the packet to the service machine by further using the extracted service tag to select an encapsulation mechanism for encapsulating the packet to send to the service machine.

8. The non-transitory machine readable medium of claim 7, wherein the service switching gateway selects the encapsulation mechanism from a group of encapsulation mechanisms that includes two or more of:
Generic Routing Encapsulation (GRE) tunneling;
Internet Protocol Security (IPsec) tunneling;
Virtual Local Area Network (VLAN) encapsulation; and
Internet Protocol (IP) encapsulation.

9. A non-transitory machine readable medium storing a service-switching program for directing a packet to a service machine to perform a service on the packet, the program for execution by at least one hardware processing unit, the program comprising sets of instructions for:
receiving an encapsulated packet comprising an encapsulation header that includes a service tag that identifies (i) a source identifier identifying a source machine for the packet and (ii) a service identifier identifying the requested service;
extracting, from the encapsulated packet, the service tag;
from a plurality of service policies, selecting a particular service policy by using a mapping structure that maps service tags to service policies to select the particular service policy associated with the extracted service tag;
using the selected service policy to select a particular service machine to perform a service operation on the packet; and
forwarding the packet to the selected particular service machine.

10. The non-transitory machine readable medium of claim 9, wherein the set of instructions for selecting the particular service policy comprises a set of instructions for selecting an encapsulation mechanism for encapsulating the packet to send to the selected particular service machine.

11. The non-transitory machine readable medium of claim 10, wherein the service-switching program selects the encapsulation mechanism from a group of encapsulation mechanisms that includes two or more of:
Generic Routing Encapsulation (GRE) tunneling;
Internet Protocol Security (IPsec) tunneling;
Virtual Local Area Network (VLAN) encapsulation; and
Internet Protocol (IP) encapsulation.

12. The non-transitory machine readable medium of claim 9, wherein the received encapsulated packet is a first received packet, the program further comprising sets of instructions for:
receiving a second packet from the particular service machine to which the first packet was forwarded; and
reconstructing the service identifier and the source identifier for the second packet based on the selected service policy.

13. The non-transitory machine readable medium of claim 9, wherein the service tag comprises one or more of: a GRE key, an IPSec Security Parameter Index (SPI), a VLAN tag, and IP header options.

14. The non-transitory machine readable medium of claim 9, wherein the packet originates from a machine that executes on a host computer and the packet is encapsulated by a service-originating switch executing on the host computer.

15. The non-transitory machine readable medium of claim 9, wherein the packet originates from a machine that executes on a host computer and the packet is encapsulated by a service originating service-originating switch operating outside of the host computer.

16. A non-transitory machine readable medium storing a service-switching program for directing a packet to a service machine to perform a service on the packet, the program for execution by at least one hardware processing unit, the program comprising sets of instructions for:
receiving an encapsulated packet comprising an encapsulation header that includes a source identifier identifying a source machine for the packet and a service identifier identifying the requested service;
extracting, from the encapsulated packet, the source and service identifiers;
from a plurality of service policies, selecting a particular service policy based on the extracted source and service identifiers, said selected service policy specifying a particular forwarding operation to perform; and
based on the particular forwarding operation, forwarding the packet to a service machine, wherein at least two different service policies for two different source clients specify the same forwarding operation, and at least two different service policies for two other different source clients specify different forwarding operations.

17. The non-transitory machine readable medium of claim 16, wherein the program further comprises a set of instructions for maintaining a mapping between the service machine and one or more of:
a source machine;
a requested service;
the service identifier; and
a tunnel encapsulation.

18. The non-transitory machine readable medium of claim 16, wherein the service identifier comprises one or more of: a GRE key, an IPSec Security Parameter Index (SPI), a VLAN tag, and IP header options.

* * * * *